(12) United States Patent
Ekdahl

(10) Patent No.: US 9,225,913 B2
(45) Date of Patent: Dec. 29, 2015

(54) DEVICE FOR IMAGING WITHIN THE IR RANGE

(75) Inventor: Bengt Ekdahl, Solna (SE)

(73) Assignee: FLIR Systems AB, Danderyd (SE)

( * ) Notice: Subject to any disclaimer, the term of this patent is extended or adjusted under 35 U.S.C. 154(b) by 1083 days.

(21) Appl. No.: 13/000,034

(22) PCT Filed: May 19, 2009

(86) PCT No.: PCT/SE2009/000257
§ 371 (c)(1), (2), (4) Date: Mar. 11, 2011

(87) PCT Pub. No.: WO2009/154533
PCT Pub. Date: Dec. 23, 2009

(65) Prior Publication Data
US 2011/0164139 A1 Jul. 7, 2011

(30) Foreign Application Priority Data
Jun. 19, 2008 (SE) ........................................ 0801436

(51) Int. Cl.
*G01D 18/00* (2006.01)
*H04N 5/33* (2006.01)
*H04N 5/365* (2011.01)

(52) U.S. Cl.
CPC ............... *H04N 5/33* (2013.01); *H04N 5/3655* (2013.01)

(58) Field of Classification Search
CPC ....................................................... H04N 5/33
USPC ........................................................ 250/252.1
See application file for complete search history.

(56) References Cited

U.S. PATENT DOCUMENTS

| 4,965,448 | A | * | 10/1990 | Morse et al. ................ 250/252.1 |
| 5,354,987 | A | * | 10/1994 | MacPherson .............. 250/252.1 |
| 6,184,529 | B1 | | 2/2001 | Contini |
| 6,515,285 | B1 | | 2/2003 | Marshall et al. |
| 2007/0120058 | A1 | | 5/2007 | Blackwell et al. |

FOREIGN PATENT DOCUMENTS

| EP | 1253779 A1 | 10/2002 |
| WO | WO-9913355 A1 | 3/1999 |

OTHER PUBLICATIONS

PCT/ISA/210—International Search Report—Aug. 19, 2009.
PCT/ISA/237—Written Opinion of the International Searching Authority—Aug. 19, 2009.
Patrice Fillon et al.; "Cooled IR detectors calibration analysis and optimization"; SPIE Orlando 2005; pp. 1/12-12/12.
Supplementary European Search Report—Apr. 17, 2013 (Issued in Counterpart Application No. 09766923.8).

* cited by examiner

*Primary Examiner* — David Porta
*Assistant Examiner* — Edwin Gunberg
(74) *Attorney, Agent, or Firm* — Haynes and Boone, LLP

(57) ABSTRACT

A device for imaging within the IR range. The imaging device includes a cooled unit having a cooled matrix with detectors and a calibrating device for individual calibration of the detectors of the detector matrix with respect to amplification and/or offset. The calibrating device includes at least one radiator, which is housed in or can be introduced into the imaging device, and a signal-processing unit.

12 Claims, 3 Drawing Sheets

DEVICE FOR IMAGING WITHIN THE IR RANGE

CROSS-REFERENCE TO RELATED APPLICATIONS

This application claims priority to Swedish patent application 0801436-7 filed 19 Jun. 2008 and is the national phase of PCT/SE2009/000257 filed 19 May 2009.

FIELD OF THE INVENTION

The present invention relates to a device for imaging within the IR range, such as an IR camera or IR scanner, comprising a cooled unit having a cooled matrix with detectors and a calibrating device for individual calibration of the detectors of the detector matrix with respect to amplification and/or offset, which calibrating device comprises at least one radiator, which is housed in or can be introduced into the imaging device, as well as a signal-processing unit.

BACKGROUND OF THE INVENTION

In order to achieve good image quality for IR systems having detector matrices, the detectors of the matrix need to be individually calibrated. This is carried out partly in the manufacture of the system and partly during operation. A term which is often used in this context is Non Uniformity Connection, so-called NUC. Depending on the detector technology which is used, for example QWIP, MCT, InSb, the solutions can look somewhat different. Essentially, however, it is a question of correcting for the behaviour of the detectors with regard to amplification and offset. The calibration of IR detectors according to NUC principles is described, inter alia, in the article "Cooled IR detectors calibration analysis and optimization" by Patrice Fillon et al, SPIE ORLANDO 2005, [5784-42], pages 1-12.

Primarily due to the fact that the camera systems are not time-stable, the calibration needs to be repeated also during operation. In order to make an entirely new Non Uniformity Correction, two black-body radiators with a relatively large temperature difference are required in order to calculate amplification factors or gain factors for a so-called gain map.

Often the gain map is generated with external flat black-body radiators, i.e. black-body radiators disposed on the input opening of the imaging device. This is preferably done prior to delivery of the imaging device. Certain imaging devices require, however, that an entirely new NUC can be made internally within the device. This applies, inter alia, to devices which are not sufficiently time-stable in terms of temperature to be able to use gain maps generated prior to delivery of the imaging device. Normally, flat black-body radiators are used, which are heated or cooled to mutual, relatively large temperature differences in order to calculate a new NUC.

The introduction of a plurality of black-body radiators into an imaging device, which have to be cooled and/or heated to suitable temperatures, entails a complex and expensive solution which easily becomes heavy and unwieldy. In certain modern-day imaging devices, it has been chosen, therefore, to only use one radiator internal to the imaging device, and without cooling, to achieve a NUC calibration for the generation of a new offset calculation and offset map.

One problem with imaging devices, such as IR systems and IR cameras, having a radiator without cooling is that temperature rises occur primarily due to heat from cooling machinery and electronics. The heating can amount to more than 15° C. This means that the imaging device must handle IR information which can be 15° C. higher than the maximum working temperature specified for the imaging device. With low maximum values, for example 60° C., for scene temperatures, values for noise equivalent temperature difference, NETD, and thus values for minimum resolvable temperature difference MRTD, suffer when the response must be lowered to ensure that the temperature of the radiator will be able to be used to calculate a new offset map. With, for example, a maximum working temperature of 70° C. and a temperature rise, due to internal warming, of 15° C., the imaging device is necessarily set for a scene temperature of 85° C., which means that the NETD and MRTD are considerably worsened.

SUMMARY OF THE INVENTION

The object of the present invention is to provide an imaging device with radiator which does not require separate cooling of the radiator and which is capable of handling temperature rises caused by heat from cooling machinery, electronics or heat-generating sources.

The object of the invention is achieved by an imaging device characterized in that contained radiators are configured to reflect radiation from the cooled unit to the surface of the detector matrix. Through the introduction of radiators with this configuration, the facility is provided to create gain maps and offset maps which are colder than the temperature of the imaging device, since cold from the cooled detector matrix is mixed with the temperature of the imaging device in order to lower the experienced temperature reflected in the radiator. There is therefore no need to separately regulate the temperatures of integral radiators, but rather they can be arranged to track the temperature of the imaging device, but at a suitably lower temperature level.

In general terms, the invention is based on the principle that with an emissivity lower than 1, the reflected temperature from a surface is affected by the temperatures of surrounding objects. The reflected experienced temperature will thus have an impact both up and down, depending on the temperature of the surface itself and the temperatures of the radiation incoming to the surface. In cold climate, an offset map can be plotted with a temperature which differs less from the scene temperature, whereby better spatial NETD values are obtained. New, temporary gain maps can here be calculated with the use of two radiators.

According to one advantageous embodiment, the device comprises a radiator configured to reflect radiation from the cooled unit to the surface of the detector matrix. With just a single radiator, the imaging device can be made compact with a minimal number of integral components, at the same time as new offset maps can be designed during operation, with the avoidance of temperature rise problems.

According to a more competent embodiment, the imaging device comprises at least two radiators configured to reflect radiation from the cooled unit to the surface of the detector matrix. This embodiment allows offset and gain maps to be designed during operation in the absence of separate cooling of the radiators and with the avoidance of temperature rise problems.

According to one proposed embodiment of the imaging device, at least one of the contained radiators is configured with an emissivity less than 1 and preferably with an emissivity within the range 0.5 to 0.8. The reflected temperature from such a radiator, influenced by the temperatures of other objects of the imaging device, can here be reduced to a lower level in a well controlled manner. For long-wave IR radiation, a reduction in temperature of about 10 degrees for 0.8 emissivity and a reduction in temperature of about 30 degrees for 0.5 emissivity is obtained. For IR radiation within the medium-wave range, a lower reduction in temperature is obtained.

According to one refinement, contained radiators are configured with a surface which is concave towards the detector matrix. This configuration allows the radiator to be placed in front of the cooled unit without intervening optics. The invention can here be characterized in that a contained radiator with a surface concave towards the detector matrix and reflecting to the surface of the detector matrix is arranged in front of the cooled unit without intervening optically correcting elements.

According to an alternative embodiment, the device is characterized in that a contained radiator reflecting to the surface of the detector matrix is arranged in front of the cooled unit with intervening optically correcting elements. The introduction of optical elements between the radiator and the cooled unit allows the radiator to be configured and adapted to the imaging device with great latitude, in concert with the physical and optical properties of the optical elements.

In an expedient embodiment, it is proposed that the optically correcting elements shall be constituted by one or more lenses.

According to yet another refinement, at least one of the contained radiators is configured substantially as a spherical inner surface. The spherical surface has in this context proved especially suitable for mixing the temperature of the radiator with the cooled regulated temperature of the detector matrix in order to reduce the reflected experienced temperature. Advantageously, the radius of the sphere is dimensioned such that the detector matrix sees itself.

Where the imaging device comprises a plurality of radiators, these can be disposed, for example, on a rotatable wheel. According to an embodiment proposed here, the imaging device is characterized in that contained radiators are disposed on a rotatable wheel, which rotatable wheel is arranged to introduce a selected radiator in position in front of the detector matrix by rotation of the wheel.

BRIEF DESCRIPTION OF THE DRAWINGS

The invention will be further explained below with reference to the appended non-scale drawings, in which.

DETAILED DESCRIPTION OF EMBODIMENTS OF THE INVENTION

Figure 1:
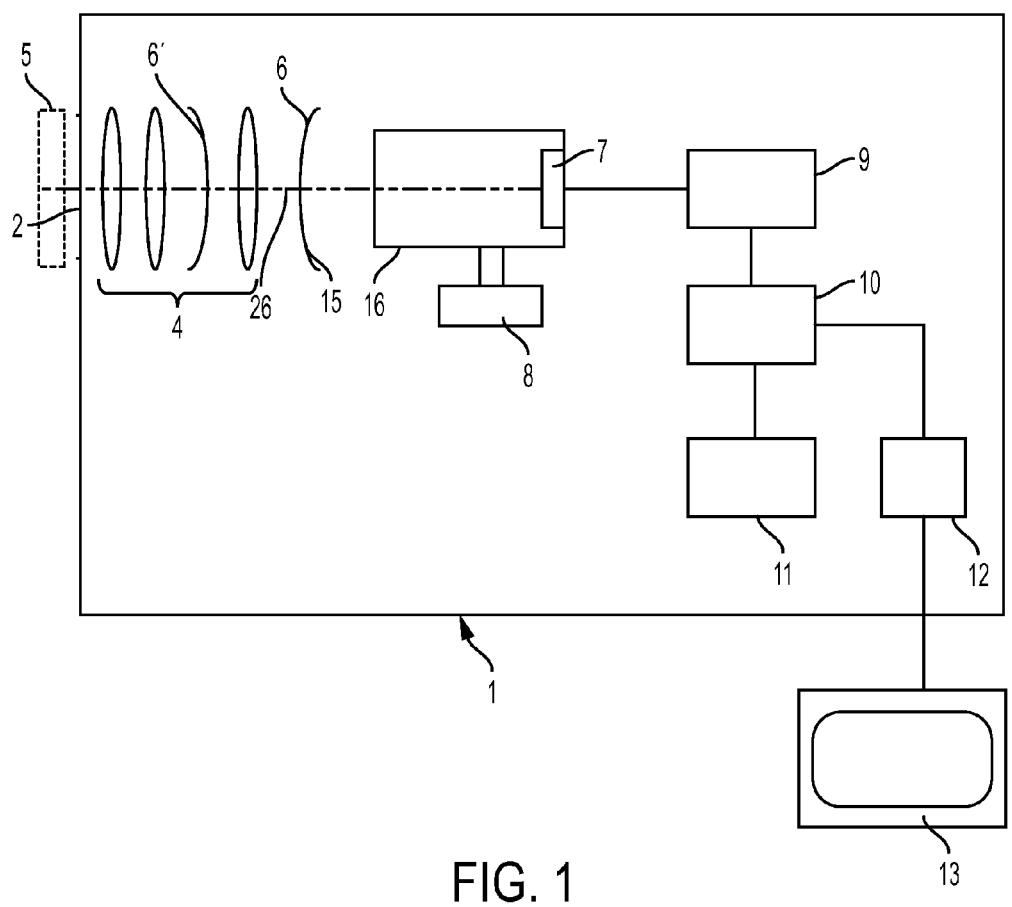
FIG. 1 shows schematically an example of an imaging camera in the form of an IR camera with radiators according to the principles of the invention, with and without intervening optically correcting elements.

The IR camera 1 shown in FIG. 1 comprises an input opening 2 with a lens arrangement 4. In front of the input opening, a black-body radiator 5 is indicated with dashed lines. On the output side of the lens arrangement 4, a radiator 6 is arranged in a space between the lens arrangement 4 and a detector matrix 7. An optical axis 26 is shown, by means of a dash-dot line, passing through the centre of the lens arrangement 4 and the radiator 6 up to the detector matrix 7. The radiator 6 is configured with a concave surface 15 facing towards the detector matrix 7.

Besides the radiator 6, a radiator 6' is found arranged in the lens arrangement 4 and here configured with a convex surface facing towards the detector matrix 7. The working of the radiators 6 and 6' is described more extensively below with reference to FIGS. 2 and 3.

The detector matrix 7 is cooled to a fixed temperature by means of a cooling plant 8, say a so-called Stirling cooler. The cooling plant is coupled to a cooled unit with a cooling screen 16 and accommodating the cooled detector matrix 7. The fixed temperature is normally low and temperatures around 200° C. are common.

For driving of the detectors of the detector matrix, drive circuits 9 are provided. A signal generated in the detector matrix, for example in the form of a conventional video signal, is processed in a signal-processing block 10. In addition there is a block 11 for the memorization of, inter alia, offset maps and gain maps. Via video drive circuits 12, an image signal is delivered in analog or digital form, which can be fed to an internal or external display 13.

Figure 2:
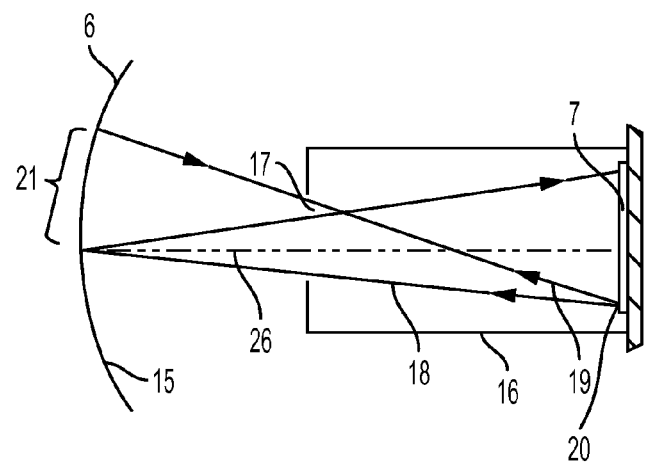
FIG. 2 shows in greater detail a first placement of a radiator according to the principles of the invention, in concert with a cooled detector matrix without intervening optically correcting elements.

FIG. 2 illustrates in greater detail how the concave radiator 6 is arranged in front of the detector matrix 7. The concave surface 15 of the radiator 6 here has a spherical shape. In front of the detector matrix 7 is a cooling screen 16 having a delimiting opening 17 towards the radiator 6. The figure illustrates with two alternative ray paths 18, 19 the area 21 which can be covered by a peripheral detector 20 in the detector matrix 7 as a result of the limitation defined by the delimiting opening 17. Corresponding areas can be identified for other locations of detectors in the detector matrix 7.

Figure 3:
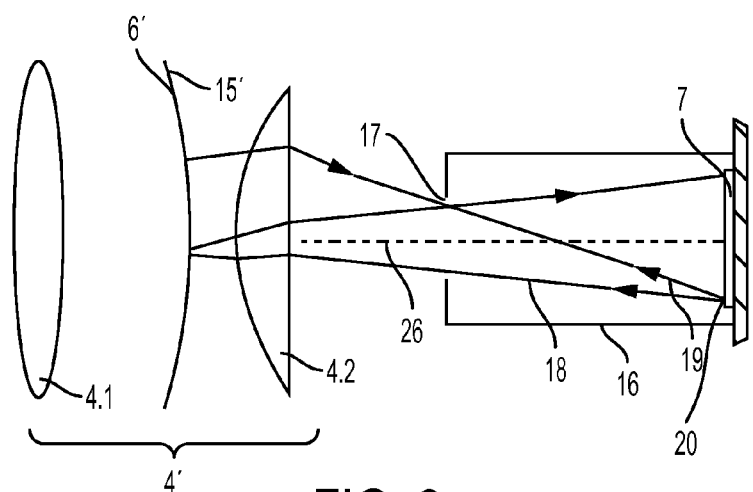
FIG. 3 shows in greater detail an alternative placement of a radiator according to the principles of the invention, in concert with a cooled detector matrix with intervening optically correcting elements.

FIG. 3 shows a radiator 6' which has a convex surface 15' facing towards the detector matrix 7. According to the shown embodiment, the radiator 6' is arranged in a lens arrangement 4', which is here illustrated to comprise a convex lens 4.1 and a plano-convex lens 4.2. Alternative ray paths are illustrated in the same way as with reference to FIG. 2, using the symbols 18 and 19. By relocating the radiator 6' with intervening optically correcting elements, such as the plano-convex lens 4.2, greater latitude is afforded in the configuration of the radiator 6', with simultaneous dimensioning of integral optically correcting elements.

Detectors included in the detector matrix 7 do not behave identically, but show variations in amplification and offset. In order to handle this, gain and offset maps stored in the block 11 have already been created prior to delivery. This can be done in a somewhat simplified manner, so that at least two black-body radiators 5 with a relatively large temperature difference are placed in front of the input opening 2 one at a time. For each detector in the detector matrix 7, a signal for each of the black-body radiators 5 is detected. With the aid of the individual signal values for a detector, a linear line 14.1-14.n is created over the temperature range in question.

Figure 4A:
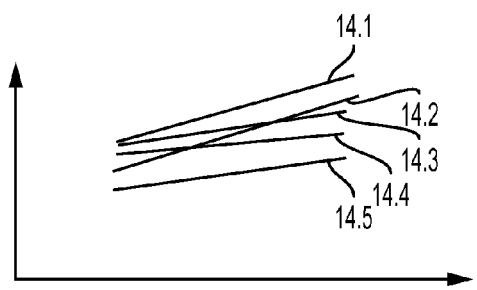
FIGS. 4a-4c illustrate in diagram form the effect of the introduction of a gain map and offset map applied to the detectors of the imaging camera in its detector matrix.

FIG. 4a shows an example of such lines 14.1-14.5 created for five detectors, in which each detector can also be assumed to correspond to one pixel. The diagram in FIG. 4a shows for individual detectors a detected signal as a function of incoming flow, the incoming flow being assumed to vary substantially linearly with the prevailing temperature. The amplification variation for the individual detectors is now stored in a gain map in the block 11, so as subsequently, during normal operation of the IR camera, to correct for amplification variations.

Figure 4B:
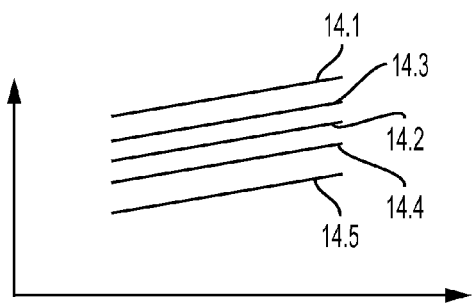
Figure 4C:
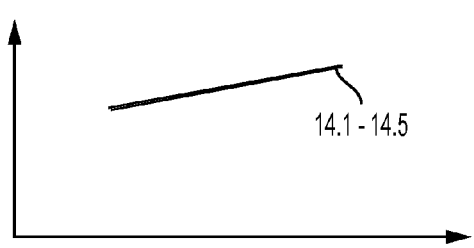

FIG. 4b illustrates the influence of the gain map on the detector signals, meaning that the linear lines have now become parallel. The gain map thus ensures that all pixels react the same to all input signals, but at different levels.

Correspondingly, an offset map is plotted, which, applied to the detector signals shown in FIG. 4b, results in parallel displacement of the detector signals of the detectors such that the linear lines 14.1-14.5 coincide. The offset map also achieves the effect that all pixels acquire the same level in respect of a certain input signal.

Mathematically, the correction for amplification and offset can be expressed by the following formula:

$$\text{Pixel\_corr}(x,y) = \text{Pixel\_uncorr}(x,y) * \text{gain}(x,y) + \text{offset}(x,y)$$

This means that a corrected pixel, Pixel_corr(x,y) at the point x,y is obtained by multiplying the uncorrected pixel, Pixel_uncorr(x,y), at the same point x,y, by the value of the amplification map, gain(x,y), at the same point x,y, and adding the value of the offset map, offset(x,y), at the point x,y.

Figure 5:
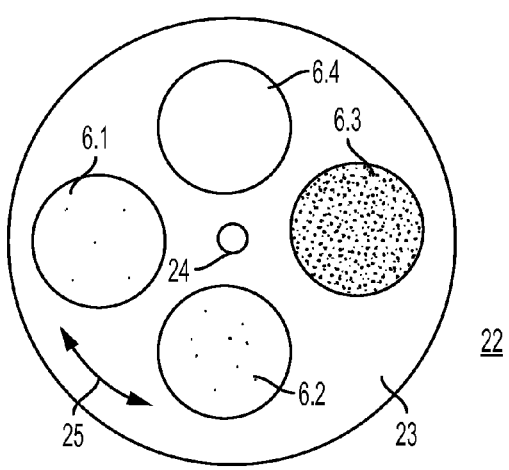
FIG. 5 shows schematically an example of an arrangement comprising radiators which can be introduced in front of the detector matrix.

FIG. 5 shows schematically an example of an arrangement 22 comprising radiators which can be introduced in front of the detector matrix 7. According to the shown arrangement, a plate 23 rotatable about an axis 24 is provided with three radiators 6.1-6.3. The radiators have different reflecting capacity and emissivity. The rotatable plate 23 is arranged adjacent to the delimiting opening 17 of the detector matrix 7 in such a way that a radiator of choice 6.1-6.3 can be rotated into the position assumed by the radiator 6 in FIGS. 1 and 2 or assumed by the radiator 6' in FIG. 3, by a rotary movement of the plate 23 about its axis 24 parallel with the optical axis 26 of the imaging device. Besides the three radiators 6.1-6.3, there is an opening 6.4 to allow them to be turned in directly in front of the ray path during normal operation, when no calibration is being performed. A double-directed arrow 25 indicates possible rotary movement about the axis 24.

The invention is not limited to the embodiments described by way of example above, but can be subjected to modifications within the scope of the following patent claims.

The invention claimed is:

1. A device for imaging within the IR range, comprising: a cooled unit comprising a cooled matrix with detectors and a calibrating device for individual calibration of the detectors of the detector matrix with respect to amplification and/or offset, wherein the calibrating device comprises at least one radiator configured to reflect radiation from the cooled unit to a surface of the detector matrix and arranged directly in an optical axis of the imaging device, and a signal-processing unit.

2. The device according to claim 1, wherein the device comprises at least two radiators configured to reflect radiation from the cooled unit to the surface of the detector matrix.

3. The device according to claim 1, wherein at least one of the radiators is configured with an emissivity less than 1.

4. The device according to claim 1, wherein at least one of the radiators is configured with an emissivity within the range 0.5 to 0.8.

5. The device according to claim 1, wherein the radiators are configured with a surface which is concave towards the detector matrix.

6. The device according to claim 5, wherein at least one of the radiators is configured substantially as a spherical inner surface.

7. The device according to claim 6, wherein the radius of the sphere is dimensioned such that the detector matrix sees itself.

8. The device according to claim 1, wherein one of the at least one radiator comprises a surface concave towards the detector matrix and reflecting to the surface of the detector matrix is arranged in front of the cooled unit without intervening optically correcting elements.

9. The device according to claim 1, wherein one of the at least one radiator reflects to the surface of the detector matrix is arranged in front of the cooled unit with intervening optically correcting elements.

10. The device according to claim 9, wherein the intervening optically correcting elements are constituted by one or more lenses.

11. The device according to claim 1, wherein the at least one radiator is disposed on a rotatable wheel, which rotatable wheel is arranged to introduce a selected radiator in position in front of the detector matrix by rotation of the wheel.

12. The device according to claim 1, wherein the device is an IR camera or IR scanner.

* * * * *